(12) United States Patent
Liu et al.

(10) Patent No.: US 8,068,445 B2
(45) Date of Patent: Nov. 29, 2011

(54) SCHEDULING UPLINK SOUNDING SIGNALS

(75) Inventors: Qingwen Liu, San Richardson, TX (US); Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1013 days.

(21) Appl. No.: 11/934,055

(22) Filed: Nov. 1, 2007

(65) Prior Publication Data

US 2008/0165728 A1    Jul. 10, 2008

Related U.S. Application Data

(60) Provisional application No. 60/879,182, filed on Jan. 8, 2007.

(51) Int. Cl.
| | |
|---|---|
| H04W 4/00 | (2009.01) |
| H04W 72/00 | (2009.01) |
| H04J 3/00 | (2006.01) |
| H04B 7/26 | (2006.01) |

(52) U.S. Cl. ........ 370/280; 370/329; 370/336; 370/345; 455/450; 455/509; 455/562.1

(58) Field of Classification Search .......... 370/280, 370/329, 336, 345; 455/450, 509, 562.1
See application file for complete search history.

(56) References Cited

U.S. PATENT DOCUMENTS

| | | | | |
|---|---|---|---|---|
| 7,006,466 | B2 * | 2/2006 | Borst et al. | 370/329 |
| 7,039,442 | B1 * | 5/2006 | Joham et al. | 455/562.1 |
| 7,139,593 | B2 * | 11/2006 | Kavak et al. | 455/562.1 |
| 7,333,835 | B2 * | 2/2008 | Nagaraj | 455/562.1 |
| 7,450,673 | B2 * | 11/2008 | Jin et al. | 375/347 |
| 7,570,624 | B2 * | 8/2009 | Shapira | 370/338 |
| 7,668,555 | B2 * | 2/2010 | Jin | 455/456.2 |
| 7,688,879 | B2 * | 3/2010 | Ryu | 375/148 |
| 7,697,485 | B2 * | 4/2010 | Liu et al. | 370/334 |
| 7,778,211 | B2 * | 8/2010 | Hedayat et al. | 370/310 |
| 7,924,957 | B2 * | 4/2011 | Jin | 375/347 |
| 7,966,043 | B2 * | 6/2011 | Guo et al. | 455/562.1 |
| 2002/0172269 | A1 | 11/2002 | Xu | |
| 2005/0032521 | A1 * | 2/2005 | Lee et al. | 455/450 |
| 2006/0034165 | A1 | 2/2006 | Levy | |
| 2006/0111129 | A1 | 5/2006 | Ihm et al. | |
| 2006/0194548 | A1 | 8/2006 | Nagaraj | |
| 2006/0281494 | A1 | 12/2006 | Wilson et al. | |
| 2008/0039098 | A1 * | 2/2008 | Papasakellariou et al. | 455/442 |
| 2008/0108310 | A1 * | 5/2008 | Tong et al. | 455/69 |
| 2009/0196203 | A1 * | 8/2009 | Taira et al. | 370/280 |

OTHER PUBLICATIONS

PCT International Search Report and Written Opinion in counterpart International Application No. PCT/US07/83438, dated Mar. 11, 2008.

\* cited by examiner

*Primary Examiner* — Alpus H Hsu

(57) ABSTRACT

A method and apparatus are provided for scheduling a transmission of uplink sounding signals for a mobile station (MS). The method comprises receiving a request to send the MS downlink signals associated with a service flow at a first frame, searching a scheduling database for pending uplink bandwidth requests from the MS, scheduling uplink transmission slots for the MS to transmit uplink signals in a second frame without scheduling a sounding signal when a uplink bandwidth request associated with the MS is present in the scheduling database, computing beamforming weighting vectors for the MS using the uplink signals, and transmitting the downlink signals using the beamforming weighting vectors at a third frame subsequent the first frame.

14 Claims, 3 Drawing Sheets

SCHEDULING UPLINK SOUNDING SIGNALS

CROSS REFERENCE

The present application claims the benefit of U.S. Provisional Application Ser. 60/879,182, which was filed on 8 Jan. 2007.

BACKGROUND

The accuracy of beamforming weighting vectors is crucial to the performance of a wireless communications network employing a beamforming technique. A base transceiver station (BTS) computes beamforming weighting vectors based on downlink channel characteristics of the communication channel between the BTS and a mobile station (MS). The BTS obtains the downlink channel characteristics by requesting the MS or a customer premises equipment (CPE) to send training symbols through the communication channel in the uplink direction.

Once the BTS receives the training symbols, it extracts channel information about the downlink channel to compute beamforming weighting vectors. Channel information includes uplink channel quality information (CQI), carrier-to-interference-plus-noise ratio (CINR), Doppler frequency, Received Signal Strength Indication (RSSI), etc. Training symbols can be sent in the same format as uplink data or in a special uplink sounding format. Training symbols sent in the sounding signal format have better efficiency and are called sounding signals.

A communication channel in a wireless communications network has a fixed amount of radio bandwidth. Sending training symbols consumes radio resources and thus reduces the radio bandwidth reserved for sending data. Therefore, it is essential that a network should reduce overhead incurred as a result of training symbol transmission.

One way to deal with the issue related to radio resource consumption is to reduce the number of training symbol transmissions while providing channel information to the BTS. This could be effective because the data transmitted by the MS carries channel information similar to that carried by training symbols. If the BTS extracts channel information from the data transmitted by the MS, it will be reduce the needs for the BTS to transmit additional training symbol. In other words, the MS will need to send training symbols to the BTS only when there is no uplink data traffic.

Embodiments of the present invention disclose a scheduling algorithm that allocates transmission slots for uplink sounding signals efficiently.

SUMMARY

A method and apparatus are provided for scheduling a transmission of uplink sounding signals for a mobile station (MS). The method comprises receiving a request to send the MS downlink signals associated with a service flow at a first frame, searching a scheduling database for pending uplink bandwidth requests from the MS, scheduling uplink transmission slots for the MS to transmit uplink signals in a second frame without scheduling a sounding signal when a uplink bandwidth request associated with the MS is present in the scheduling database, computing beamforming weighting vectors for the MS using the uplink signals, and transmitting the downlink signals using the beamforming weighting vectors at a third frame subsequent the first frame.

The construction and method of operation of the invention, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The disclosed method is applicable to a variety of wireless systems using various access methods such as time-division-multiple-access (TDMA), frequency-division-multiple-access (FDMA), code-division-multiple-access (CDMA), wave-division-multiple-access (WDMA) and orthogonal-frequency-division-multiple-access (OFDMA). Networks that can benefit from the disclosed method include cellular networks, local area networks (WLANs), personal area networks (WPANs), and sensor networks.

Figure 1:
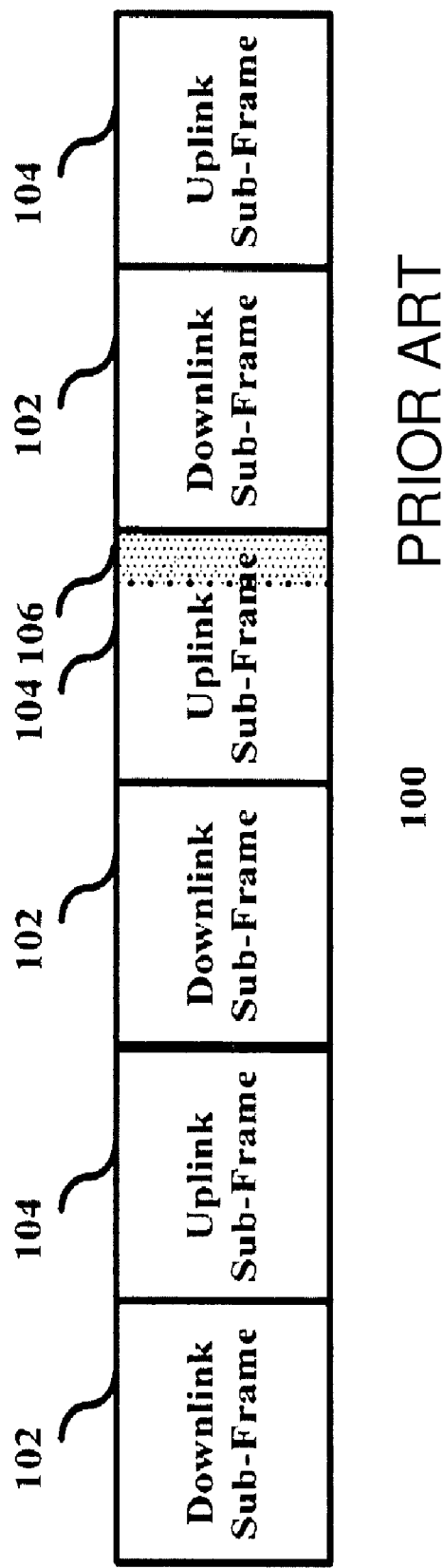
FIG. 1 illustrates a conventional method for allocating transmission slots for sounding signals in a wireless communications system employing time division duplex (TDD).

FIG. 1 illustrates a conventional method for allocating transmission slots for sounding signals in a wireless communications system employing time division duplex (TDD). In a TDD frame, a downlink subframe 102 is followed by an uplink subframe 104. Transmission slots 106, which is part of an uplink sub-frame 104, is allocated on demand for each service flow that is identified by its connection identification (CID). The time required for allocating sounding signal transmission slots for each service flow is short enough to guarantee that the downlink beamforming weighting vectors of the MS having the service flow are available for each downlink burst transmission request.

The present invention provides a novel technique for scheduling downlink and uplink data transmissions. This technique reduces the need to schedule uplink transmissions of sounding signals periodically. The present invention discloses a request-based sounding allocation method in which the transmission of an uplink sounding signal is scheduled for a specific mobile station (MS) only when there is request for a downlink transmission associated with a service flow to the mobile station. Since the allocation of the transmission slots for the sounding signals is on-demand, resource utilization becomes efficient.

For example, when a BTS receives a downlink data transmission request associated with a service flow, it first checks if there is an uplink data transmission request from the MS having the service flow. If the BTS determines that the MS has issued an uplink data transmission request, the scheduler of the BTS can allocate uplink transmission slots for transmitting uplink data before allocating downlink transmission slots. The downlink beamforming weighting vectors can be calculated based on the information obtained from the uplink data. As a result, a training symbols transmission will not be required. However, if the BTS determines that the MS has not issued any uplink data transmission request, the MS will need to send training symbols so that the BTS can compute beamforming weighting vectors.

Figure 2:
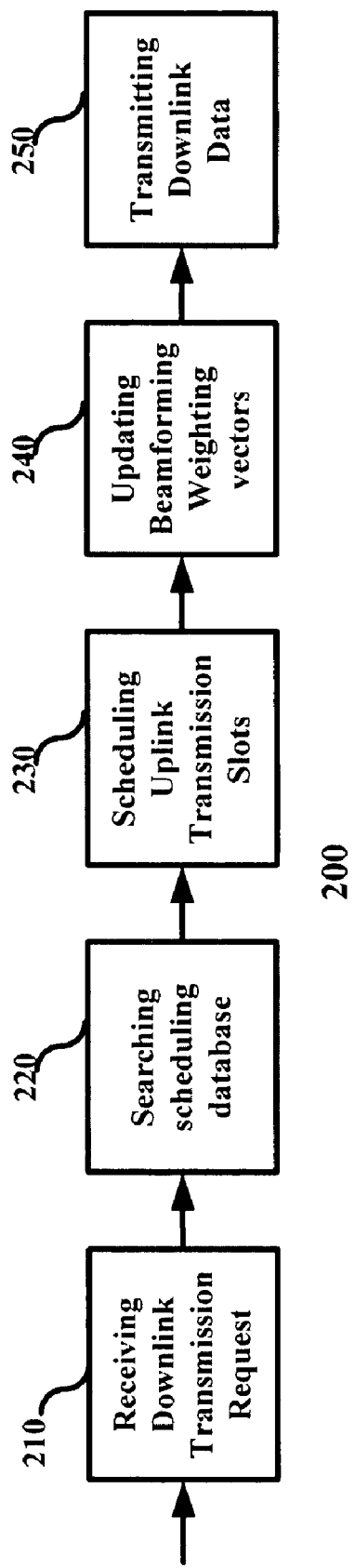
FIG. 2 is a flow diagram illustrating the method disclosed in the present invention to schedule an uplink transmission slots.

FIG. 2 is a flow diagram illustrating the method in accordance with the present invention. A base transceiver station (BTS) receives a downlink transmission request associated with a service flow (step 210). The BTS identifies a destination MS with which the service flow is associated. The BTS searches the scheduling database to determine whether there is a pending uplink transmission request from the destination MS (step 220). Subsequently, the BTS schedules uplink transmission slots in a subsequent frame for the destination MS (step 230).

The content of the uplink transmission depends on the outcome of step 220. If there is a pending uplink transmission request for data, the destination MS transmits data and pilot signals using the allocated uplink transmission slots. However, if there is no pending uplink transmission request for data, the MS transmits sounding signals in the allocated uplink transmission slots. The BTS computes beamforming weighting vectors for the MS based on the information obtained from the uplink transmission (step 240). Afterwards, the BTS transmits the downlink data using the updated beamforming weighting vectors in the subsequent frame (step 250).

The BTS allocates transmission slots for transmitting uplink signals either in the current frame or at least one frame behind the current frame. The current frame is the frame that the BTS receives the downlink transmission request in step 210. The decision on when to allocate uplink transmission slots is based on the constraints of a wireless communications system.

Most wireless communications systems require that the control message be sent one frame before the actual uplink transmission. If a wireless communications system does not have this constraint, the scheduling of uplink transmission slots can be at the same frame transmitting scheduling information.

Figure 3:
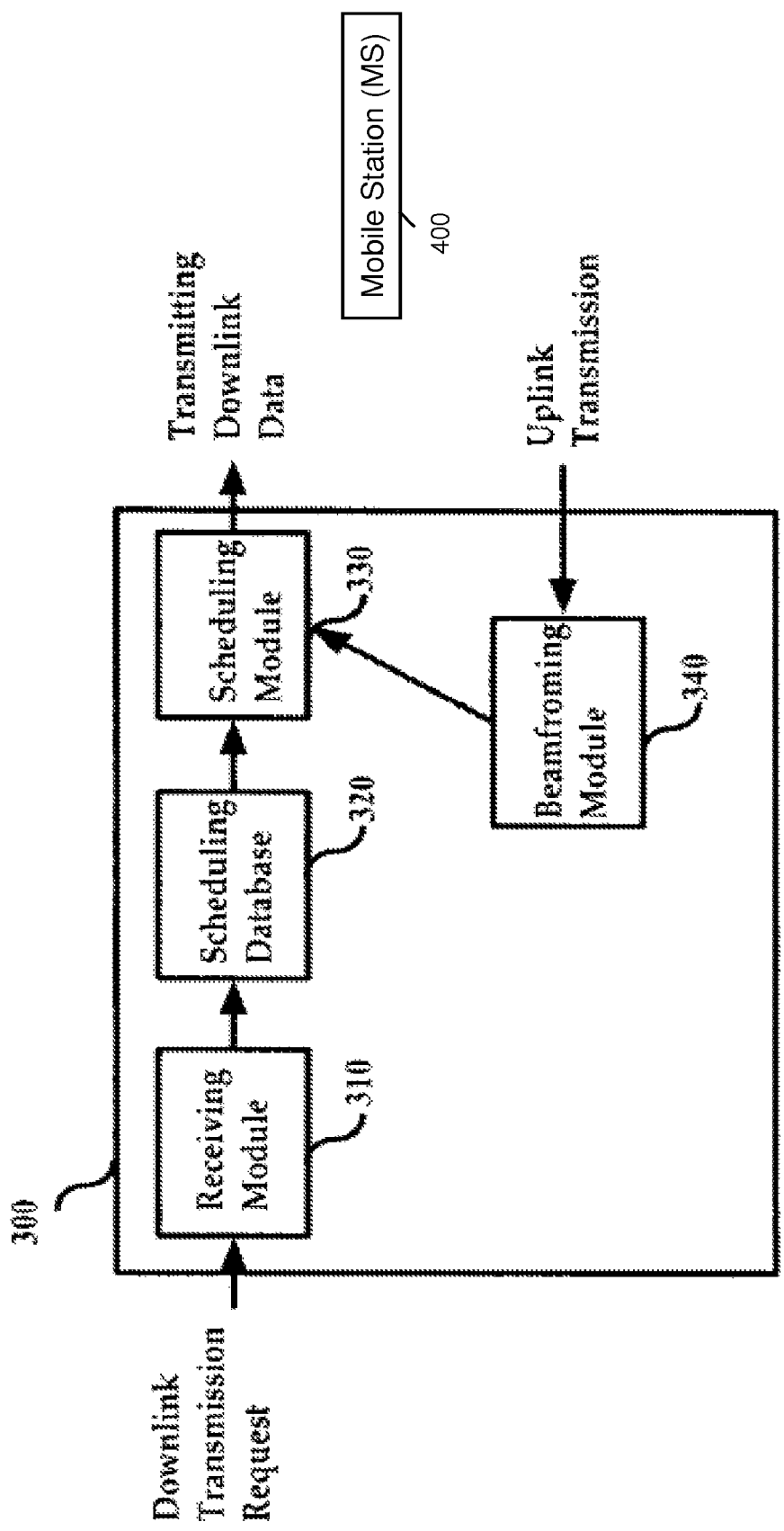
FIG. 3 is an exemplary BTS system embodying the method in accordance with the present invention.

FIG. 3 is an exemplary BTS system 300 embodying the method in accordance with the present invention. A receiving module 310 receiving a downlink transmission request associated with a service flow. The BTS 300 identifies a destination MS with which the service flow is associated. The destination MS is shown at reference numeral 400 in FIG. 3. The BTS 300 searches the scheduling database module 320 to determine whether there is a pending uplink transmission request from the destination MS. The outcome of the search is sent to a scheduling module 330. The scheduling module 330 schedules uplink transmission slots in a subsequent frame for the destination MS.

After receiving the uplink transmission from the MS, the beamforming module 340 computes the beamforming weighting vectors for the MS based on the information obtained from the uplink transmission. The content of the uplink transmission depends on the outcome of the search. If there is a pending uplink transmission request for data, the destination MS transmits data and pilot signals using the allocated uplink transmission slots. However, if there is no pending uplink transmission request for data, the MS transmits sounding signals in the allocated uplink transmission slots. Afterwards, the BTS 300 transmits the downlink data using the updated beamforming weighting vectors in the subsequent frame.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
   at a base transceiver station, determining that there are downlink signals associated with a service flow to be sent to a mobile station at a first frame;
   searching a scheduling database for pending uplink requests from the mobile station;
   scheduling uplink transmission slots for the mobile station to transmit uplink signals in a second frame without scheduling the transmission of uplink sounding signals by the mobile station when an uplink request associated with the mobile station is present in the scheduling database;
   receiving at the base transceiver station uplink signals transmitted from the mobile station during the second frame;
   at the base transceiver station, computing beamforming weighting vectors for the mobile station based on the uplink signals received from the mobile station during the second frame; and
   transmitting during a third frame subsequent the first frame the downlink signals from the base transceiver station to the mobile station using the beamforming weighting vectors.

2. The method of claim 1, wherein receiving the uplink signals comprises receiving data and pilot signals.

3. The method of claim 2, wherein computing the beamforming weighting vectors is based on the data and pilot signals.

4. The method of claim 1, wherein scheduling further comprises scheduling uplink transmission slots for the mobile station to transmit uplink sounding signals when it is determined that no uplink request associated with the mobile station is present in the scheduling database.

5. The method of claim 4, wherein computing the beamforming weighting vectors is based on the sounding signal received from the mobile station.

6. The method of claim 1, and further comprising transmitting information indicating the uplink transmission slots allocated for the mobile station based on the scheduling, and wherein scheduling comprises scheduling the uplink transmission slots during the same frame that the information indicating the uplink transmission slots are sent to the mobile station.

7. The method of claim 1, wherein the second frame is at least one frame after the first frame.

8. The method of claim 1, wherein the third frame is at least one frame after the second frame.

9. A method comprising:

at a base transceiver station, determining that there are downlink signals associated with a service flow to be sent to a mobile station at a first frame;

searching a scheduling database for pending uplink requests from the mobile station;

scheduling uplink transmission slots for the mobile station to transmit uplink signals in a second frame without scheduling the transmission of uplink sounding signals by the mobile station when an uplink request associated with the mobile station is present in the scheduling database and scheduling uplink sounding signals to be transmitted by the mobile station when no uplink request associated with the mobile station is present in the scheduling database;

receiving at the base transceiver station uplink signals transmitted from the mobile station during the second frame;

at the base transceiver station, computing beamforming weighting vectors for the mobile station using the uplink signals received from the mobile station during the second frame; and transmitting during a third frame subsequent the first frame the downlink signals from the base transceiver station to the mobile station using the beamforming weighting vectors.

10. The method of claim 9, wherein computing beamforming weighting vectors is performed based on data and pilot signals contained in the uplink signals received from the mobile station.

11. The method of claim 9, wherein computing the beamforming weighting vectors is based on the sounding signal received from the mobile station.

12. The method of claim 9, and further comprising transmitting information indicating the uplink transmission slots allocated for the mobile station based on the scheduling, and wherein scheduling comprises scheduling the uplink transmission slots during the same frame that the information indicating the uplink transmission slots are sent to the mobile station.

13. The method of claim 9, wherein the second frame is at least one frame after the first frame.

14. The method of claim 9, wherein the third frame is at least one frame after the second frame.

* * * * *

UNITED STATES PATENT AND TRADEMARK OFFICE
CERTIFICATE OF CORRECTION

PATENT NO. : 8,068,445 B2  
APPLICATION NO. : 11/934055  
DATED : November 29, 2011  
INVENTOR(S) : Liu et al.

Page 1 of 1

It is certified that error appears in the above-identified patent and that said Letters Patent is hereby corrected as shown below:

On the Title page of the patent in section (75) Inventors, in Qingwen Liu's residence, replace "San Richardson, TX" with -- Richardson, TX --.

Signed and Sealed this
Twenty-fourth Day of January, 2012

David J. Kappos  
*Director of the United States Patent and Trademark Office*